United States Patent
Evanicky et al.

[11] Patent Number: 6,061,104
[45] Date of Patent: May 9, 2000

[54] FLAT PANEL DISPLAY AND STAND WITH VERTICAL ADJUSTMENT AND TILT ADJUSTMENT

[75] Inventors: Daniel E. Evanicky; Thomas Mabry, both of San Jose; Carl Engelbrecht, Los Gatos, all of Calif.

[73] Assignee: Silicon Graphics, Inc., Mountain View, Calif.

[21] Appl. No.: 09/120,962

[22] Filed: Jul. 22, 1998

[51] Int. Cl.⁷ .................................................. H04N 5/655
[52] U.S. Cl. ..................... 348/827; 248/280; 248/921; 248/923; 340/700; 340/720; 358/248; 358/249
[58] Field of Search .......................... 348/827; 248/278; 340/720; 312/306

[56] References Cited

U.S. PATENT DOCUMENTS

| | | | |
|---|---|---|---|
| 4,616,218 | 10/1986 | Bailey et al. | 340/720 |
| 5,061,022 | 10/1991 | Meriwether | 312/324 |
| 5,593,221 | 1/1997 | Evanicky et al. | 353/122 |
| 5,630,638 | 5/1997 | Hirasawa et al. | 296/65.1 |
| 5,842,672 | 12/1998 | Sweere et al. | 248/278.1 |
| 5,924,780 | 7/1999 | Ammon et al. | 312/306 |

*Primary Examiner*—Howard Britton
*Assistant Examiner*—Shawn An
*Attorney, Agent, or Firm*—Wagner Murabito & Hao LLP

[57] ABSTRACT

A display assembly that includes a flat panel display and a display stand. A hinge that attaches to the housing of the display provides for tilt adjustment. The display stand includes two rails that attach to a base and a sliding frame that is coupled to the hinge. The two rails support the sliding frame such that the sliding frame can move up and down along the two rails. A rotary dampener dampens downward movement of the sliding frame. The display stand also includes a latching mechanism that selectively latches the sliding frame to one of the rails. The latching mechanism includes a handle that can be manually operated so as to selectively engage and disengage the latching mechanism. Movement of the handle of the latching mechanism releases the latching mechanism. The display can then be moved up or down as desired to accommodate the needs of a particular user. Once the display is positioned as desired, the release of the handle operates to engage the latching mechanism. The display assembly of the present invention allows for maximum utility of desk space, has a limited footprint, and is easily adjustable. Also, the flat panel display may be mounted to structures using a mounting plate, and can be mounted to structures such as adjustable arms, walls, etc.

24 Claims, 11 Drawing Sheets

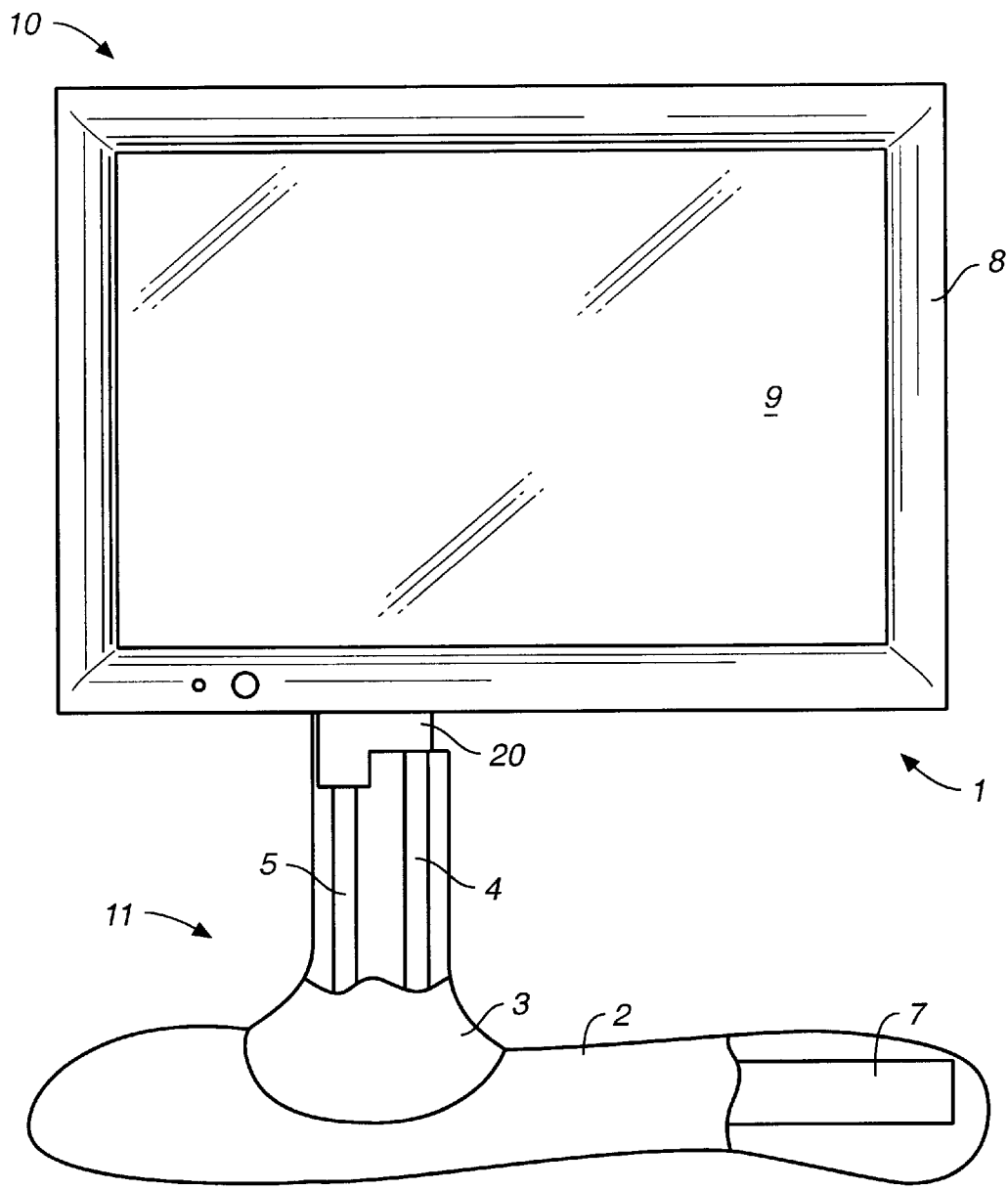
FIG._1

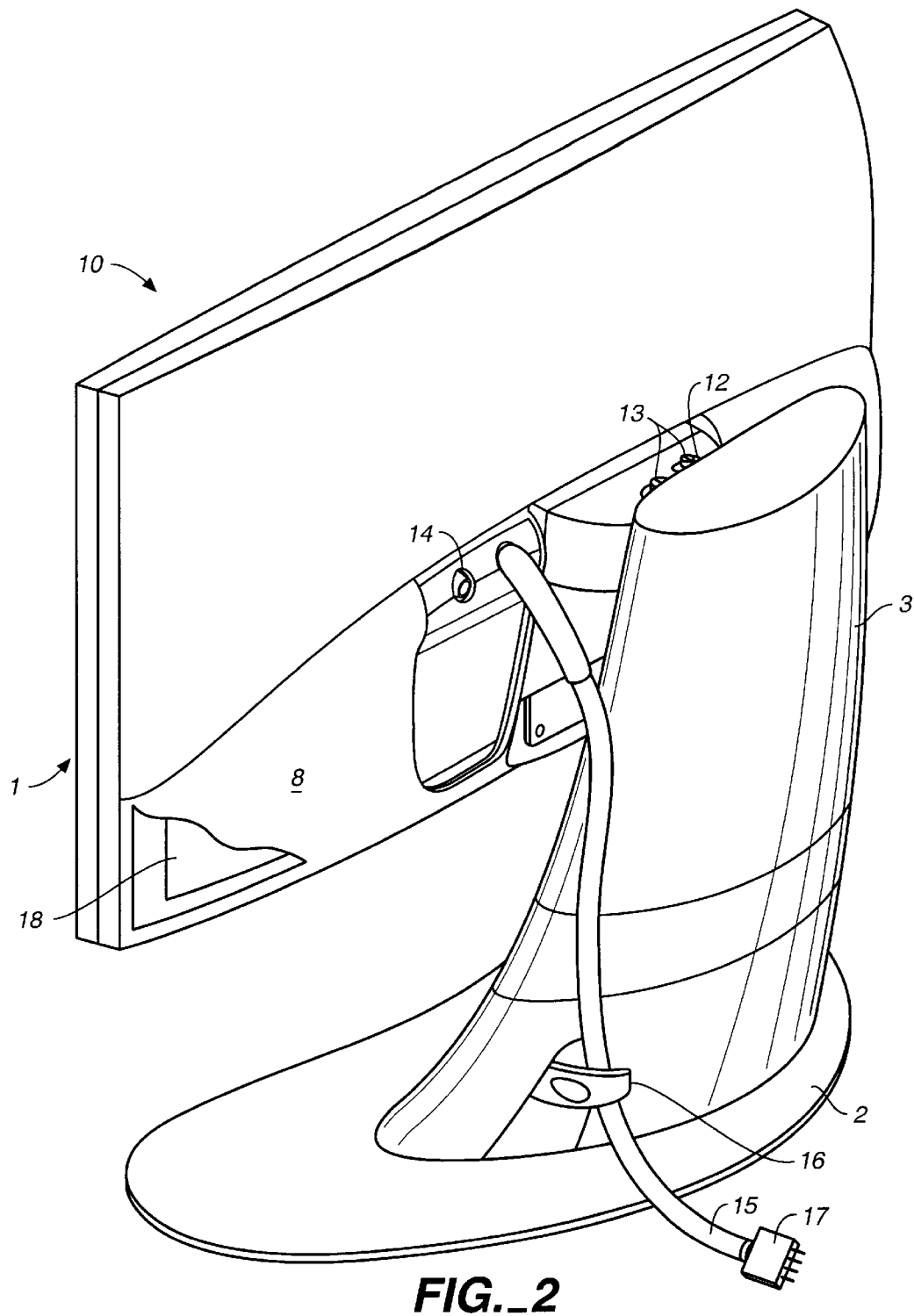
FIG._2

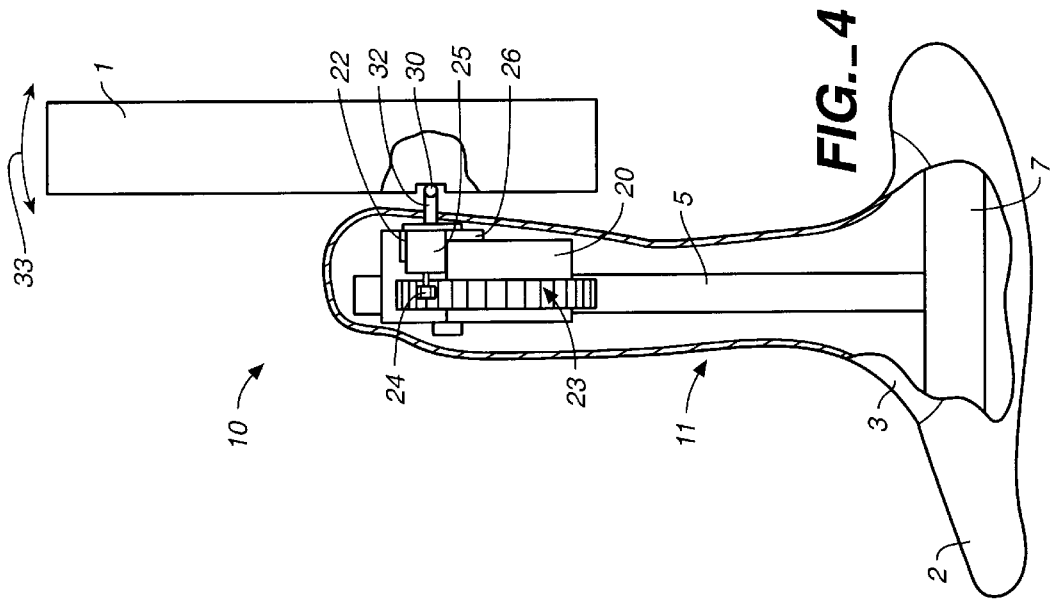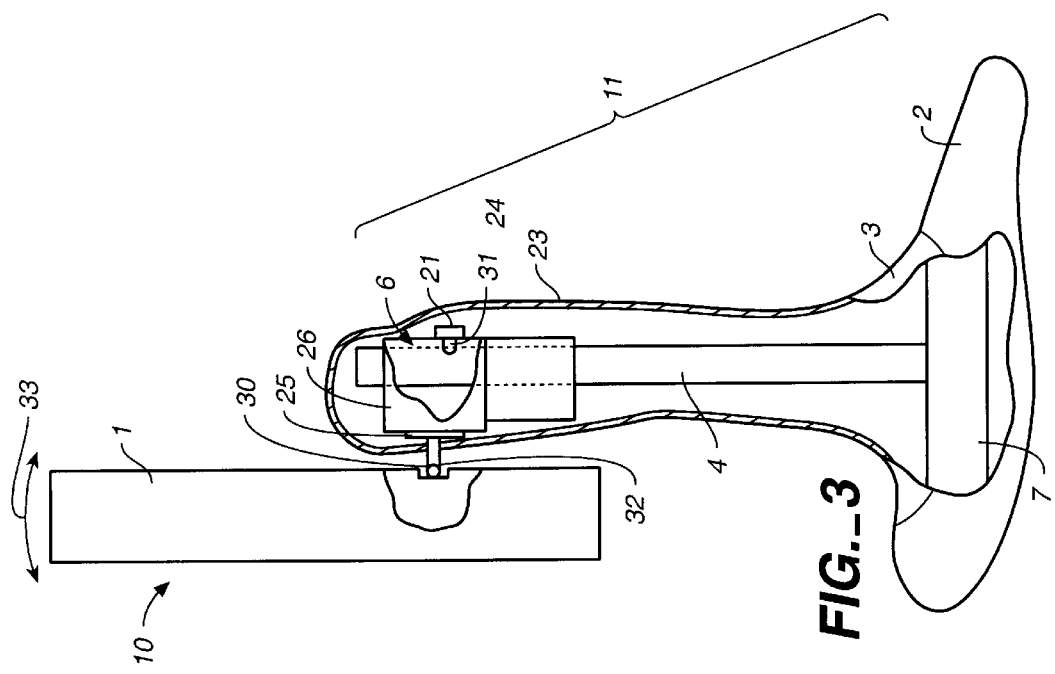

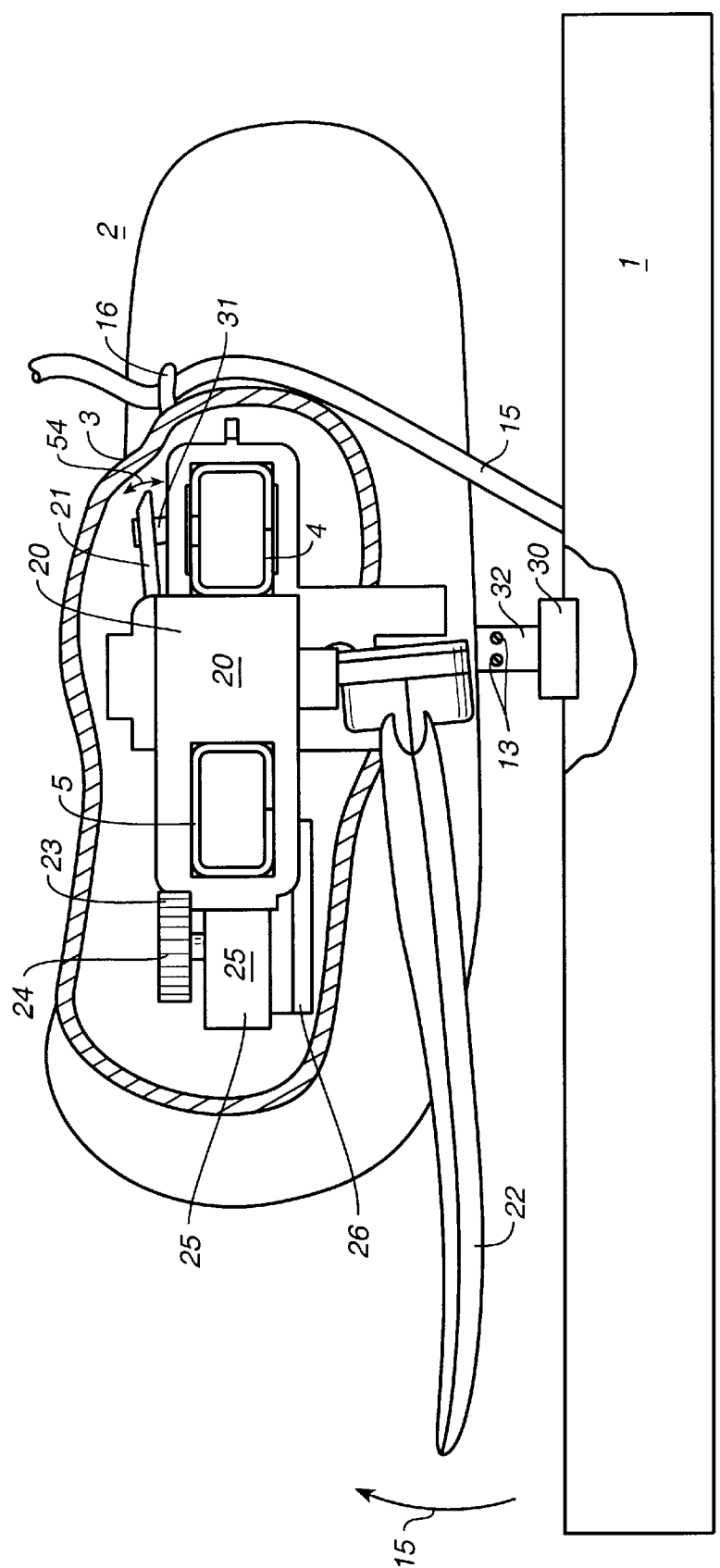
FIG._5

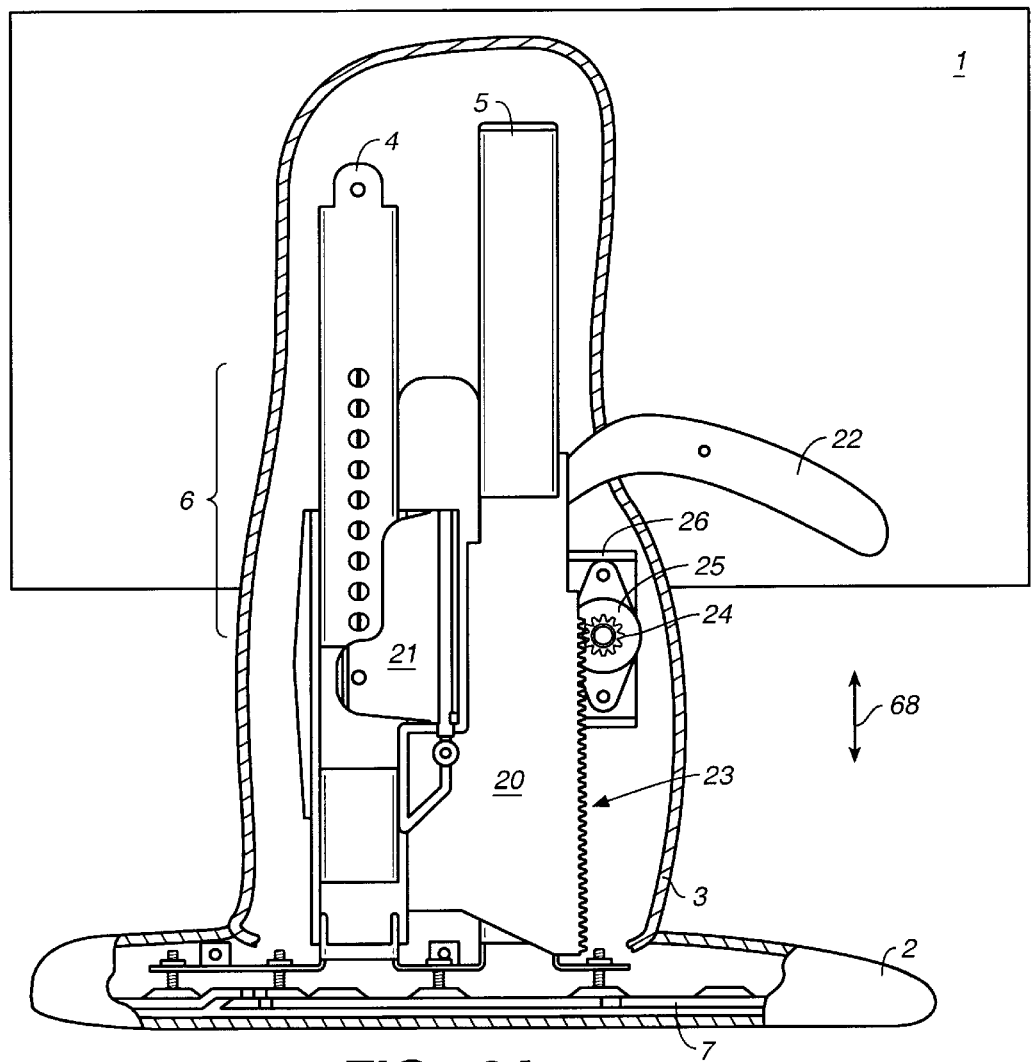
FIG._6A

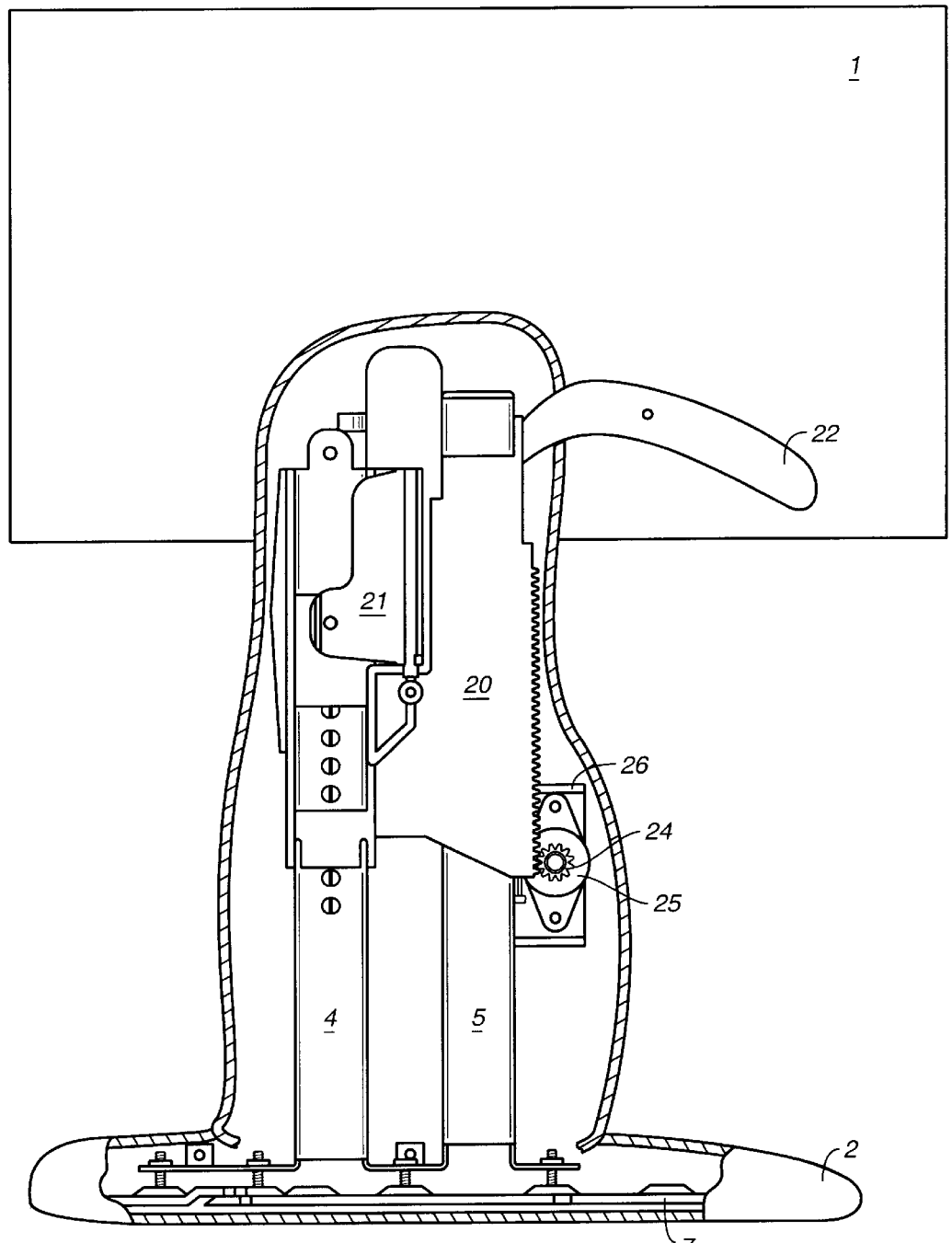
FIG._6B

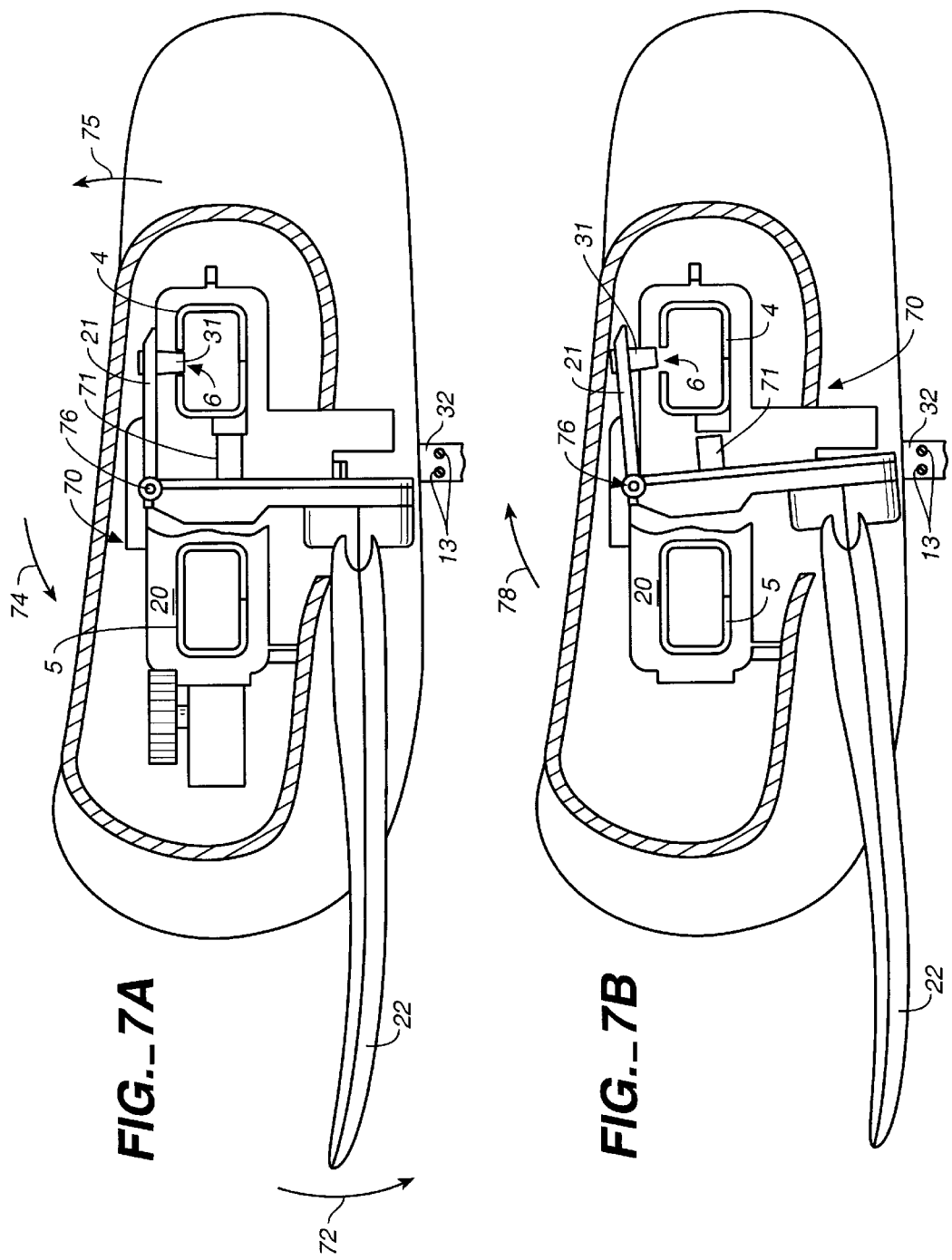

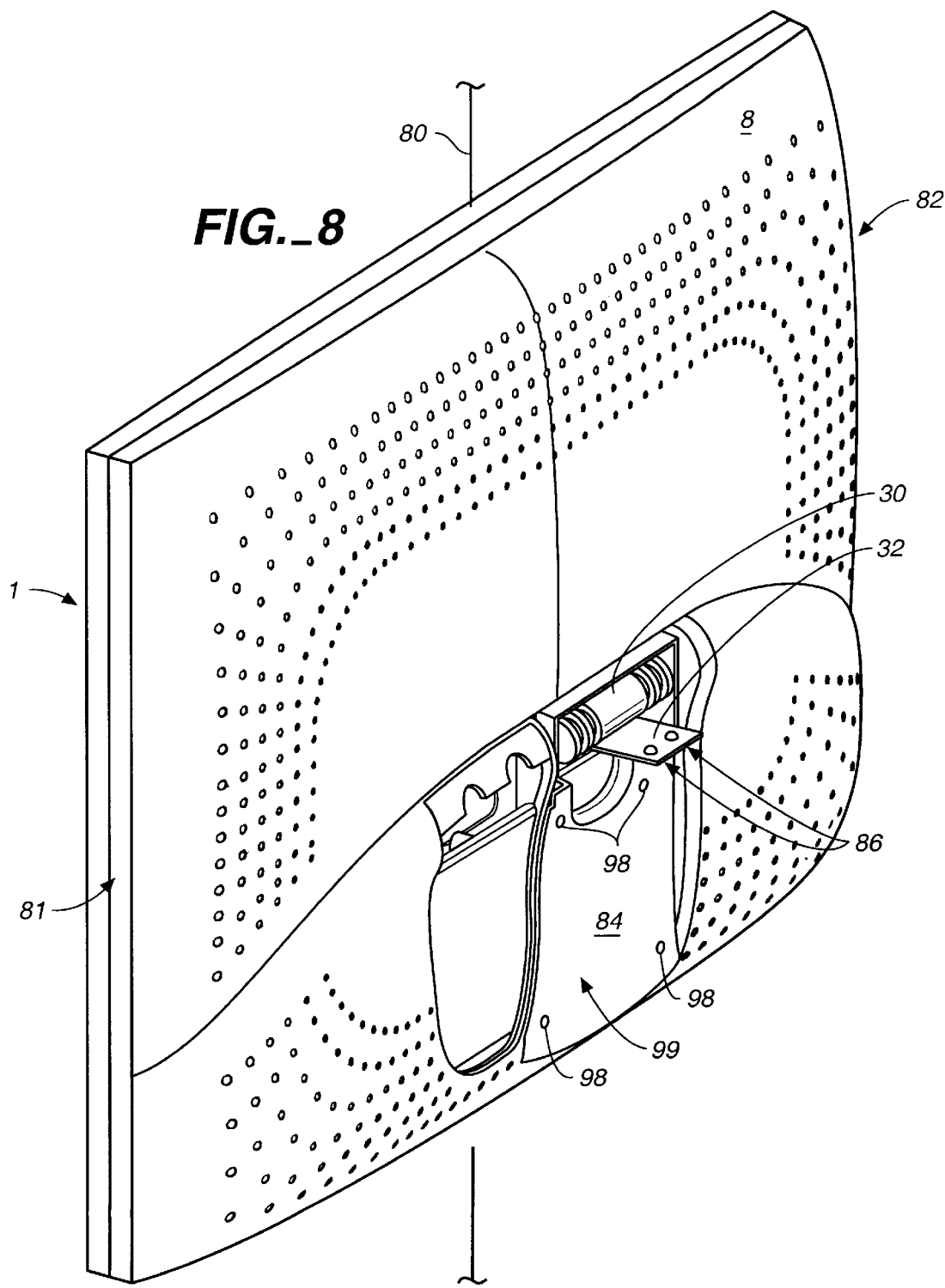

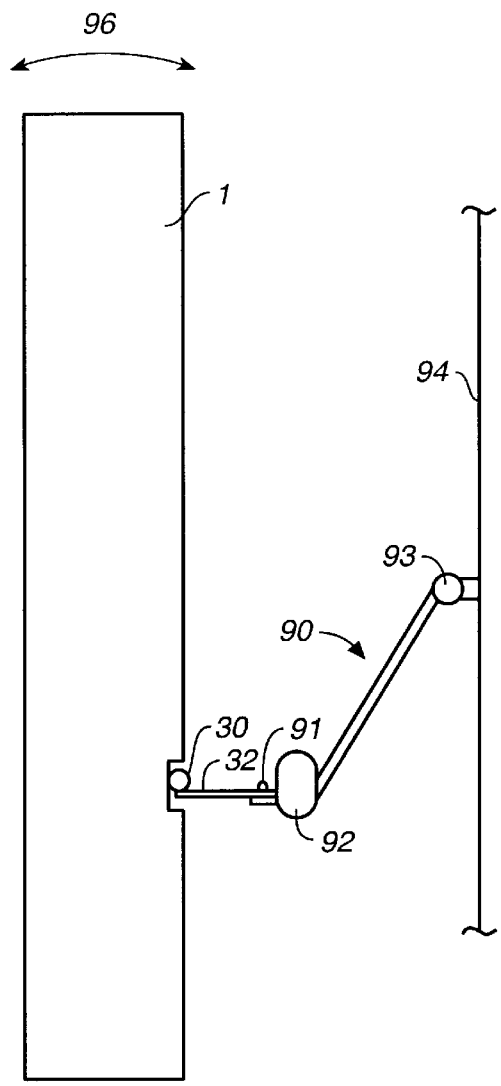
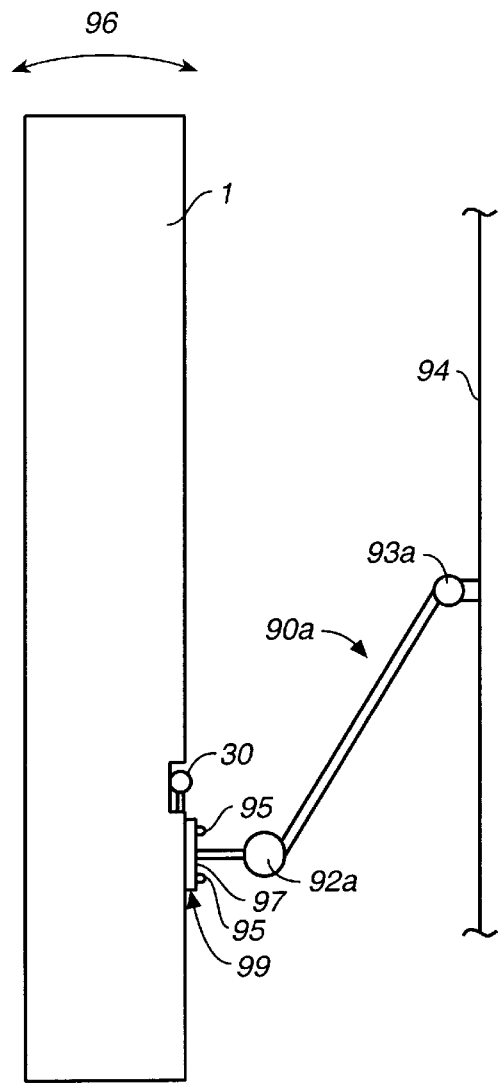
FIG._9A  FIG._9B

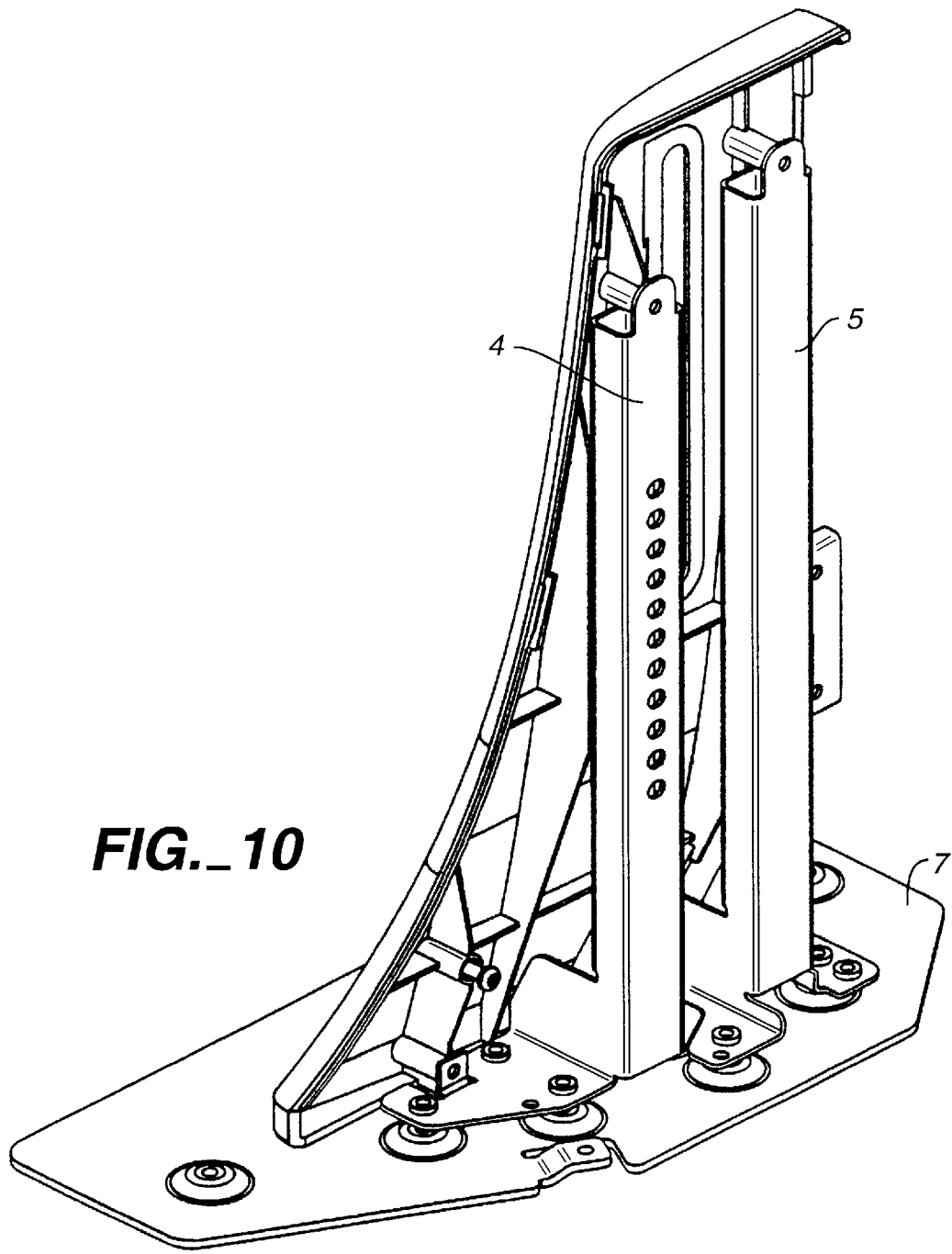
FIG._10

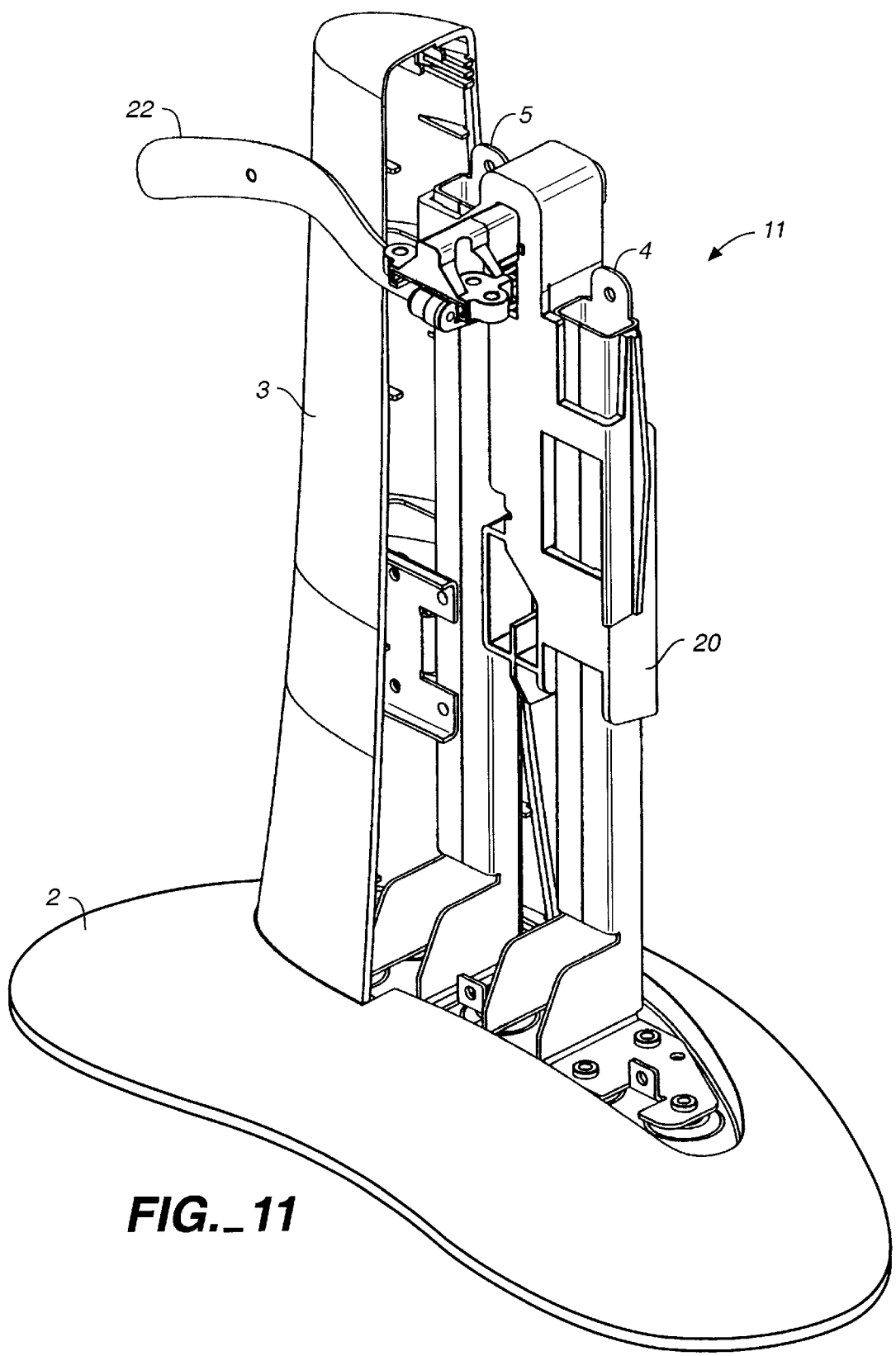
FIG._11

FLAT PANEL DISPLAY AND STAND WITH VERTICAL ADJUSTMENT AND TILT ADJUSTMENT

TECHNICAL FIELD

The present claimed invention relates to the field of display devices. More particularly, the present invention relates to a display device and a stand for a display device that provides for vertical adjustment and tilt adjustment.

BACKGROUND ART

Cathode Ray Tube (CRT) displays have been used for many years to display images. CRT displays are commonly used for display of computer generated images. CRT displays are often used for desktop computing. CRT displays typically use a layer of phosphor that is deposited on a thin glass faceplate. These CRTs generate a picture by using one to three electron guns that generate electron beams that are scanned across the phosphor in a raster pattern. The phosphor converts the electron energy into visible light so as to form the desired picture. However, prior art CRT displays are large, bulky and heavy due to the large vacuum bottles that enclose the cathode and extend from the cathode to the faceplate of the display.

Stands for prior art CRT displays typically have limited movement and adjustment because of the large size and the large weight of the display. Though some recent display stands provide for full movement of the display, these stands are bulky, difficult to adjust and unattractive. In addition, since the display stand must support a large display that is often very heavy, the stand typically has a large footprint. That is, the display stand takes up a significant amount of desk space.

Additionally, most computer users are right handed. These users typically position papers, documents and other items on the right side of the flat panel display and display stand. Also, right handed users often place items behind the right side of the flat panel display and display stand. Recent flat panel display stands align the display stand with the display such that the base of the display stand extends under the center of the display. In order to access items that are behind the display, the user must frequently reach around the right side of the display.

Other types of display technologies such as active matrix Liquid Crystal Display (LCD) devices have been used in the past for portable computers. However, these LCD devices have historically been more expensive than CRT displays. In addition, LCD devices of the prior art typically have inferior picture quality when compared with CRT displays. That is, the pictures generated by LCD devices are not as bright, are smaller in viewing size, have less contrast, and have a more limited viewing angle as compared with conventional CRTs.

Recently, new developments in LCD design and fabrication methods have produced flat panel displays that use LCD technology that have improved brightness, improved contrast, and improved viewing angle. In addition, these new flat panel display designs can now be fabricated in the larger sizes required for desktop usage. As economies of scale begin to take effect, flat panel display monitor costs will begin to approach those of their CRT counterparts.

Flat panel displays and display stands are typically designed such that the flat panel display must be used in conjunction with a particular desktop stand. Typically, the design of the flat panel display and the display stand are integrated such that the flat panel display cannot be removed from the display stand. In designs that allow the flat panel display to be removed, such removal is difficult and time consuming. Often prior art display and display stand configurations require special tools in order to remove the flat panel display from the display stand and may require removal of the housing that covers the display stand and/or removal of the housing that covers the flat panel display itself.

Flat panel displays are more versatile than older CRT displays since flat panel displays are thinner, lighter and less bulky. These features make flat panel displays desirable for use in conjunction with adjustable arm assemblies. Recently, adjustable arm assemblies have been used to position flat panel displays. However, these flat panel displays are typically designed to mate with the particular type of adjustable arm assembly to be used. Thus, flat panel displays that are designed for mating with a particular adjustable arm assembly cannot be used in conjunction with a desktop stand. However, some designs may be coupled to an adjustable arm assembly that is designed to attach to a desk.

Accordingly, what is needed is a flat panel display and display stand that is suitable for desktop use. More particularly, a flat panel display and a display stand that is easily adjustable and that has a limited footprint is required. Also, a flat panel display and display stand that allows for easy removal of the flat panel display from the display stand such that the flat panel display may be easily used with other attachment mechanisms such as adjustable arm assemblies. Moreover, a flat panel display that allows for maximum utility of desk space for right handed users is required. Also, a flat panel display and display stand that allows for adjustment is required. The present invention provides a solution to the above needs. These and other objects and advantages of the present invention will no doubt become obvious to those of ordinary skill in the art after having read the following detailed description of the preferred embodiments which are illustrated in the various drawing figures.

SUMMARY OF THE INVENTION

The present invention provides a display assembly that includes a flat panel display that is readily adjusted to accommodate the needs of a user and that is easily attached and detached.

A display assembly is disclosed that includes a flat panel display and a display stand. The flat panel display includes, as a single integral unit, all of the electronics, controls, and interfaces necessary to the operation of the flat panel display. The display stand couples to the flat panel display and provides support and adjustment for the flat panel display.

In one embodiment, a hinge is attached to the flat panel display and is attached to a mounting bracket. The mounting bracket has an opening near one end to allow for attachment by means of a screw. The flat panel display is easily attached to the display stand by attachment of the mounting bracket to the display stand and is easily detached from the display stand by detaching the mounting bracket from the display stand.

The display stand includes two rails that attach to a base. The two rails extend vertically from the base. The base supports the two rails. The display stand also includes a sliding frame. The two rails support the sliding frame such that the sliding frame moves up and down along the two rails. A rotary dampener that is coupled to one of the rails engages the rack. The rotary dampener dampens downward movement of the sliding flame but also allows free upward movement of the sliding flame.

The display stand also includes a latching mechanism that includes a latch pin and a handle. The latching mechanism is adapted to selectively latch the sliding frame to one of the rails by engaging one of a plurality of openings disposed in one of the rails. The latching mechanism includes a handle that may be manually operated so as to selectively engage and disengage the latching mechanism.

In one embodiment, the display is a thin flat panel display that includes electronic circuits and a display screen that are operable to produce images on the display screen. In one embodiment, the display is a flat panel liquid crystal display.

A plastic cover covers the base and a second plastic cover encloses the other components of the display stand. A third plastic cover fits over the hinge. These plastic covers protect users from injury resulting from contact with moving parts. In addition, the plastic covers protect the other components from damage due to debris, dust, and spillage of liquids.

When the flat panel display is coupled to the display stand, the flat panel display is moved up and down by first operating the handle of the latching mechanism such that the latching mechanism is released. The flat panel display can then be moved up or down as desired to accommodate the needs of a particular user. Once the flat panel display is positioned as desired, the release of the handle operates to engage the latching mechanism. This latches the sliding frame to one of the rails.

The flat panel display is tilted by applying a force to the flat panel display such that the hinge rotates. In one embodiment, a hinge is used that allows for 20 degrees of rotation such that the flat panel display can be tilted back 15 degrees from vertical and can be tilted forward 5 degrees from vertical. The hinge is dampened such that a predetermined amount of force is required to move the hinge. The dampened hinge requires more force to be moved than is provided by the weight of the flat panel display. Thus, once the flat panel display is moved into a particular position, the flat panel display maintains that position. The flat panel display can then be moved to a new position by applying a sufficient force so as to tilt the flat panel display into the new position.

The hinge is coupled to the flat panel display such that the hinge is off-center relative to the centerline of the flat panel display. In one embodiment, the hinge is located nearer the left side of the flat panel display. This provides for more room on the right side of the vertical portion of display stand such that items behind the display assembly can be easily accessed.

The flat panel display is also adapted to be easily attached to and detached from an adjustable arm. An adjustable arm is disclosed that includes one or more joints that allow for the movement of the flat panel display within a wide range of motion.

Thus, the present invention provides a flat panel display and display stand that allows for ready attachment of the flat panel display to the display stand and easy detachment of the flat panel display from the display stand. This allows the flat panel display to be used with other flat panel display holding mechanisms and structures such as adjustable arm assemblies. The display assembly of the present invention allows for maximum utility of desk space, has a limited footprint, and is easily adjustable.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a front cut away view of a display assembly that includes a flat panel display and a display stand in accordance with the present claimed invention.

FIG. 2 is a rear perspective view of a display assembly that includes a flat panel display and a display stand in accordance with the present claimed invention.

FIG. 3 is right side cut away view of a display assembly that includes a flat panel display and a display stand in accordance with the present claimed invention.

FIG. 4 is left side cut away view of a display assembly that includes a flat panel display and a display stand in accordance with the present claimed invention.

FIG. 5 is a top cut-away view of a display assembly that includes a flat panel display and a display stand in accordance with the present claimed invention.

FIG. 6a is a rear cut-away view of a display assembly having a sliding frame that is in its lowermost position in accordance with the present claimed invention.

FIG. 6b is a rear cut-away view of a display assembly having a sliding frame that is in its uppermost position in accordance with the present claimed invention.

FIG. 7a is a top cut-away view of a display stand illustrating a latching mechanism in the latched position in accordance with the present claimed invention.

FIG. 7b is a top cut-away view of a display stand illustrating a latching mechanism in the unlatched position in accordance with the present claimed invention.

FIG. 8 is a rear perspective view of a flat panel display and a hinge in accordance with the present claimed invention.

FIG. 9a is a side view of a flat panel display that is coupled to an adjustable arm using a mounting bracket that is coupled to a hinge in accordance with the present claimed invention.

FIG. 9b is a side view of a flat panel display that is coupled to an adjustable arm that includes a mounting plate in accordance with the present claimed invention.

FIG. 10 is a perspective view part of a display stand showing rails extending vertically from a base in accordance with the present claimed invention.

FIG. 11 perspective view of a display stand with part of the cover removed in accordance with the present claimed invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which can be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention can be practiced without these specific details. In other instances, well known methods, procedures, components, and circuits have not been described in detail as not to unnecessarily obscure aspects of the present invention.

Referring now to FIG. 1, display assembly 10 is shown to include flat panel display 1 that is supported by a display stand 11. Display screen 9 is also shown. Display stand 11 is shown to include rail 4 and rail 5 that extend vertically from base 7. In one embodiment, rail 4, rail 5, and base 7 are formed of metal so as to provide good structural support. Display stand 11 also includes sliding frame 20 that extends around rail 4 and rail 5. Sliding frame 20 is supported by rail 4 and rail 5. In one embodiment, sliding frame 20 is made of glass-filled plastic. Alternatively, sliding frame 20 can be made of metal.

Referring now to FIG. 2, cable 15 is shown to extend from flat panel display 1. In one embodiment, cable 15 couples data information to flat panel display 1 via connector 17. Cable 15 allows for flat panel display 1 to be easily coupled to a device such as, for example, a computer. Connector receptacle 14 is shown to be disposed in flat panel display 1. Connector receptacle 14 is adapted to receive a connector for coupling power from an external source to flat panel display 1.

Continuing with FIG. 2, flat panel display 1 is shown to include electronic circuits 18 that couple to cable 15 and to connector receptacle 14. Electronic circuits 18 and screen 9 are disposed in housing 8. Electronic circuits 18 are operable to display images on display screen 9 of FIG. 1.

Referring still to FIG. 2, base cover 2 includes cable holder 16 that extends from base cover 2. In one embodiment, cable holder 16 is an angled protrusion that is adapted to receive cables such as, for example, cable 15. Cable holder 16 is also well adapted to hold cables that couple to connector receptacle 14.

Referring now to FIG. 3, hinge 30 connects to flat panel display 1 and couples to bracket 32. Bracket 32 is attached to sliding frame 20 (FIG. 1) via two screws 13 of FIG. 2. Hinge 30 allows flat panel display 1 to rotate relative to sliding frame 20. In one embodiment, hinge 30 is a dampened hinge that resists movement such that the hinge only moves when a predetermined amount of manual force is applied to the flat panel display 1. Thus, hinge 30 holds flat panel display 1 in place when manual force is not being applied. This allows flat panel display 1 to be tilted in the directions shown by arrows 33 so as to accommodate the needs of a particular user. In one embodiment, hinge 30 allows for up to 20 degrees of rotation such that flat panel display 1 can be tilted backwards up to 15 degrees from vertical and can be tilted forward up to 5 degrees from vertical. In one embodiment, hinge 30 is a dampened hinge manufactured by CEMA Technologies, Inc. of Bridgeport, Pa.

Referring to FIGS. 1–3, base cover 2 covers base 7. Cover 3 attaches to base cover 2 and extends vertically so as to cover rail 4, rail 5, and sliding frame 20. In one embodiment, base cover 2 and cover 3 are made of plastic. Cover 12 is disposed between display stand 11 and flat panel display 1. Cover 12 is also formed of plastic. Cover 3 and cover 12 extend around the moving parts of display stand 11 so as to prevent injury resulting from contact with movable parts such as sliding frame 20 and hinge 30.

Referring now to FIG. 4, rack 23 runs vertically along one side of sliding frame 20. In one embodiment, sliding frame 20 is made of glass-filled plastic and rack 23 is formed of machined metal. Alternatively, rack 23 and sliding frame 20 can be a single piece of machined metal. In one embodiment, rack 23 includes teeth that extend from rack 23 in a regular fashion.

Continuing with FIG. 4, display stand 11 is shown to include rotary dampener 25. Rotary dampener 25 connects to bracket 26. Bracket 26 attaches to rail 5. In one embodiment, bracket 26 is a metal bracket that attaches to rail 5 and to rotary dampener 25 via screws (not shown). Rotary dampener 25 includes wheel 24. Wheel 24 has teeth that are adapted to engage the teeth of rack 23. This engagement of the teeth of wheel 24 with the teeth of rack 23 causes rack 23 and wheel 24 to move together. That is, when sliding frame 20 moves, the teeth of rack 23 engage the teeth of wheel 24 such that wheel 24 rotates. Thus, as sliding frame 20 moves up and down vertically along rail 4 and rail 5, wheel 24 rotates. In one embodiment, rotary dampener 25 dampens rotation of wheel 24 such that movement of sliding frame 20 downward is dampened while movement of sliding frame 20 upwards is not dampened. The dampening of rotary dampener 25 allows for sliding frame 20 to be easily and safely moved up and down. Also, the dampening prevents rapid downward movement of flat panel display 1. In one embodiment, rotary dampener 25 is a rotary dampener manufactured by Ace Controls, Inc. of Farmington, Mich. that has a part number RN-D2-1-152-G1.

Referring to FIG. 5, display stand 11 includes a latching mechanism that is adapted to latch sliding frame 20. This latching mechanism includes handle 22 which is integrally coupled with latch arm 21, and latch pin 31. Latch pin 31 extends from latch arm 21. In one embodiment, handle 22 is a metal lever bonded to a cosmetic plastic covering by thermal or co-injection molding methods. The movement of handle 22 as shown by arrow 51 causes latch arm 21 to move as shown by arrow 54.

Referring now to FIG. 6a, rail 4 is shown to have a plurality of openings 6 formed therein that extend vertically along rail 4. Latch pin 31 of FIG. 5 is adapted to selectively engage ones of openings 6 so as to latch sliding frame 20 to rail 4. Movement of handle 22 operates to selectively engage and disengage the latching mechanism such that sliding frame 20 can be latched to rail 4 and unlatched from rail 4.

Continuing with FIG. 6a, when the latching mechanism is disengaged, sliding frame 20 is free to move up and down vertically as shown by the directions of arrows 68. In one embodiment, sliding frame 20 is adapted to move vertically from the position shown in FIG. 6a (its lowermost position) to the position shown in FIG. 6b (its uppermost position). Upon moving sliding frame 20 from its lowermost position to its uppermost position, wheel 24 rotates and is undampened so as to allow for easy upward movement.

Referring to FIG. 6b, dampener 25 dampens rotation of wheel 24 such that downward movement of sliding frame 20 is inhibited. This prevents flat panel display 1 and sliding frame 20 from sliding rapidly downward when the latching mechanism is released. In one embodiment, the dampening effect of dampener 25 is sufficient so as to allow sliding frame 20 and flat panel display 1 to move very slowly downward when the latching mechanism is released. Also, the dampening action of dampener 25 allows for momentary actuation and release of handle 22 such that momentary actuation and release produces downward motion of sliding frame 20 to the next lowest latch opening.

FIGS. 7a–7b show the operation of latching mechanism 70. Referring now to FIG. 7a, latch arm 21 is biased in the latched position by spring 71. Upon the movement of handle 22 as shown by arrow 72, latching mechanism 70 moves into the unlatched position which is shown in FIG. 7b. As handle 22 moves, latch arm 21 pivots around pivot point 76 as shown by arrow 74, and compressing spring 71. This moves the end of latch arm 21 in the direction shown by arrow 75.

As shown by FIG. 7b, in the unlatched position, latch pin 31 is disengaged from openings 6. That is, the movement of latch arm 21 shown by arrow 75 of FIG. 7a, disengages latch pin 31 from ones of openings 6. In this position, latching mechanism 70 does not prevent movement of sliding frame 20, thereby allowing sliding frame 20 to be moved vertically along rails 4–5. Upon the release of handle 22, spring 71 applies a force that pivots latch arm 21 in the direction shown by arrow 78. This causes latch pin 31 to engage ones of openings 6. This movement brings latching mechanism 70 back into the latched position shown in FIG. 7a such that latching mechanism 70 prevents further movement of sliding flame 20.

Referring still to FIGS. 7a–7b, the operation of latching mechanism 70 allows for lever 22 to be momentarily moved and released such that latching mechanism 70 is momentarily disengaged. This causes sliding frame 20 to move downward and engages the next available opening 6.p.

Referring now to FIG. 8, flat panel display 1 can be readily attached to and detached from display stand 11 of FIGS. 1–7b. In one embodiment, mounting bracket 32 includes two openings 86 that is adapted to receive a screw such as screws 13 of FIG. 2. This allows flat panel display 1 to be detached from display stand 11 of FIGS. 1–7b by removal of two screws 13. Similarly, flat panel display 1 is readily attached by placing mounting bracket 32 against sliding frame 20 and screwing in screw 13 so as to attach mounting bracket 32 to sliding frame 20.

Referring still to FIG. 8, centerline 80 is shown to extend vertically through the center of flat panel display 1 such that it is equidistant from right side 81 and left side 82. Hinge 30 is attached to housing 8 such that it is off center. That is, centerline 84, which runs vertically through the center of hinge 30, is not aligned with the centerline 80. Instead, hinge 30 is aligned closer to left side 82. This provides more open area under flat panel display 1 on the right side of display stand 11. More particularly, by coupling flat panel display 1 such that it is off center relative to display stand 11, access to items behind display stand 11 is not hindered by cover 3. This is particularly true for users that are right handed. Thus, the display assembly of the present invention provides more usable desk space than prior art designs.

Referring to FIG. 9a, mounting bracket 32 is adapted to couple to one end of adjustable arm 90. Attachment to adjustable arm 90 is accomplished by inserting one or more screws into mounting bracket 32 such as screws 91. Screws 91 are then screwed in so as to couple flat panel display 1 to adjustable arm 90. Similarly, flat panel display 1 can be easily detached from adjustable arm 90 by removal of screws 91.

The display of the present invention can be mounted to a wall. Continuing with FIG. 9a, adjustable arm 90 is shown to be attached to an exemplary wall 94. Adjustable arm 90 includes joint 92 and joint 93 that allow for the movement of flat panel display 1 within a wide range of tilt, swivel, and rotating motion. Hinge 30 further increases the range of motion by allowing flat panel display 1 to tilt as shown by arrows 96.

Referring back to FIG. 8, mounting region 99 on the rear of flat panel display 1, which includes openings 98, allows for attachment to other structures. In the embodiment shown in FIG. 9b, flat panel display 1 is coupled to an adjustable arm 90a that includes mounting plate 97. In this embodiment, mounting region 99 is a flat region adapted to receive a flat surface of mounting plate 97. Screws 95 couple mounting plate 97 to flat panel display 1 by engaging ones of openings 98. In one embodiment, four of screws 95 engage four openings 98 so as to couple mounting plate 97 to flat panel display 1. This allows for flat panel display 1 to be easily coupled to other structures such as walls, furniture, adjustable stands or swing arms by coupling the particular structure to mounting region 99. When flat panel display 1 is attached at mounting region 99, bracket 32 is folded into a recess in the back of flat panel display 1 such that it is out of the way.

Referring still to FIG. 9b, adjustable arm 90a is shown to be attached to wall 94. Adjustable arm 90a includes joint 92a and joint 93a that allow for the movement of flat panel display 1 within a wide range of tilt, swivel, and rotating motion. In one embodiment, adjustable arm 90a is an adjustable arm manufactured by Ergotron, Inc. of Saint Paul, Minn.

FIG. 10 shows a view of the support structure that includes rail 4, rail 5, and base 7. FIG. 11 shows a perspective view of display stand 11 with one half of cover 3 removed.

Flat panel display 1 of the present invention is also well adapted to couple to other stands, surfaces, and adjustable arm devices. Since the display of the present invention includes two attachment mechanisms, it can be readily attached and detached from any of a number of different types or stands, surfaces, and adjustable arm devices. Thus, the display of the present invention is more flexible than are prior art designs that are adapted to couple to a particular interface. In addition, since flat panel display 1 includes all of the electronics, controls, and interfaces necessary to the operation of flat panel display 1, and since all of such electronics, controls, and interfaces are housed together into a single integral unit, flat panel display 1 is easily coupled to support structures such as stands, adjustable arms, etc.

Thus, the present invention provides a flat panel display and display stand that allows for ready attachment of the flat panel display to the display stand and easy detachment of the flat panel display from the display stand. This allows the flat panel display to be used with other flat panel display holding mechanisms and structures such as adjustable arm assemblies. The display assembly of the present invention allows for maximum utility of desk space, has a limited footprint, and is easily adjustable.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A display assembly comprising:
    a first rail, disposed vertically;
    a base coupled to said first rail for supporting said first rail;
    a sliding frame disposed around said first rail and having a rack disposed thereon that extends vertically, said sliding frame for moving up and down vertically along said first rail;
    a rotary dampener coupled to said first rail and including a wheel adapted to engage said rack, said rotary dampener for dampening rotation of said wheel such that downward movement of said sliding frame is dampened;

a latching mechanism for latching said sliding frame and including a handle that is moved to engage and disengage said latching mechanism; and a flat panel display including a housing, a display screen, and electronic circuits, said display screen and said electronic circuits disposed within said housing, said electronic circuits operable to display images on said display screen, said flat panel display rotatably coupled to said sliding frame wherein said flat panel display is adapted to be tilted in a plurality of degrees of freedom.

2. The display assembly of claim 1 further comprising a hinge, coupled to said flat panel display and coupled to said sliding flame, said hinge for rotating said flat panel display relative to said sliding frame.

3. The display assembly of claim 2 wherein said hinge further comprises a dampened hinge for resisting movement wherein said hinge moves when a predetermined amount of manual force is applied to said flat panel display and wherein said hinge holds said flat panel display in place when manual force is not being applied to said flat panel display.

4. The display assembly of claim 3 wherein said hinge further comprises a dampened hinge that is movable so as to allow said flat panel display to tilt within a predetermined range, said hinge coupled to said flat panel display and coupled to said sliding frame such that said flat panel display is adapted to tilt backwards three quarters of said predetermined range from vertical and tilt forward one quarter of said predetermined range from vertical.

5. The display assembly of claim 1 further comprising a second rail disposed vertically and coupled to said base, said sliding housing for moving along said second rail such that said sliding housing moves along said first rail and along said second rail.

6. The display assembly of claim 5 wherein said second rail has a plurality of openings formed therein that extend vertically, said latching mechanism further comprising a latch arm having a latch pin extending therefrom, said latch arm pivotally coupled to said sliding frame, said handle pivotally coupled to said sliding frame, said handle coupled to said latch arm such that, upon the movement of said handle, said latch arm pivots to selectively engage and disengage said latch pin with ones of said plurality of openings in said second rail.

7. The display assembly of claim 1 wherein said flat panel display couples to said sliding frame such that said flat panel display is readily attached to and detached from said sliding frame.

8. The display assembly of claim 7 wherein said flat panel display couples to said sliding frame such that said flat panel display is off center relative to the center of said flat panel display.

9. The display assembly of claim 6 further comprising a first cover and a second cover, said first cover disposed around said base and said second cover disposed to enclose said sliding frame, said first rail, and said second rail therewithin, wherein said first cover is coupled to said second cover.

10. The display assembly of claim 9 wherein said flat panel display is a liquid crystal display device.

11. A display assembly comprising:

a flat panel display including a housing, a display screen, and electronic circuits, said flat panel display having a centerline that extends vertically therethrough, said display screen and said electronic circuits disposed within said housing, said electronic circuits operable to display images on said display screen; and a dampened hinge coupled to said flat panel display such that said dampened hinge is offset from said centerline of said flat panel display, said dampened hinge coupled to a bracket, said dampened hinge for rotating such that said flat panel display rotates relative to said bracket when a predetermined amount of force is applied to said flat panel display.

12. The display assembly of claim 11 wherein said bracket has a plurality of openings formed proximate one end thereof adapted to receive a plurality of screws such that said bracket can be easily coupled to a display stand and coupled to an arm assembly by disposing a plurality of screws through said plurality of openings in said bracket, said bracket easily uncoupled from a display stand and uncoupled from an arm assembly by the removal of said plurality of screws.

13. The display assembly of claim 11 further comprising:

a mounting region disposed on the rear of said flat panel display, said mounting region including a plurality of openings, said openings adapted to receive screws.

14. The display assembly of claim 13 wherein said flat panel display is a liquid crystal display device.

15. A display assembly comprising:

a first rail disposed vertically;

a second rail disposed vertically and having a plurality of openings disposed therein, said openings extending vertically along a portion of said second rail;

a base coupled to said first rail and coupled to said second rail for supporting said first rail and said second rail;

a sliding frame disposed around said first rail and around said second rail, said sliding frame having a rack disposed thereon extending vertically, said sliding frame for moving up and down vertically along said first rail and said second rail;

a rotary dampener coupled to said first rail and including a wheel adapted to engage said rack, said rotary dampener for dampening rotation of said wheel such that downward movement of said sliding frame is dampened;

a latching mechanism including a latch pin and a handle, said latching mechanism for selectively latching said sliding frame to said second rail by selectively engaging ones of said plurality of openings disposed in said second rail upon the movement of said handle; and a flat panel display including a housing, a display screen, and electronic circuits, said display screen and said electronic circuits disposed within said housing and wherein said flat panel display is rotatably coupled to said sliding frame such that said flat panel display is adapted to be moved up and down.

16. The display assembly of claim 15 wherein said hinge further comprises a dampened hinge for resisting movement wherein said hinge moves when a predetermined amount of manual force is applied to said flat panel display and wherein said hinge holds said flat panel display in place when manual force is not being applied to said flat panel display.

17. The display assembly of claim 15 wherein said hinge further comprises a dampened hinge that is movable so as to allow said flat panel display to tilt within a predetermined range, said hinge coupled to said flat panel display and coupled to said sliding frame such that said flat panel display is adapted to tilt backwards three quarters of said predetermined range from vertical and tilt forward one quarter of said predetermined range from vertical.

18. The display assembly of claim 17 wherein said hinge is movable so as to allow said flat panel display to tilt within a twenty degree range, said hinge coupled to said flat panel display and coupled to said sliding frame such that said flat panel display is adapted to tilt backwards 15 degrees from vertical and tilt forward 5 degrees from vertical.

19. The display assembly of claim 15 further comprising a bracket coupled to said hinge and extending from said hinge, said bracket adapted to be removably coupled to said sliding frame such that said flat panel display can be readily attached and removed.

20. The display assembly of claim 19 wherein said flat panel display has a centerline running vertically therethrough and a right side and a left side, said hinge coupled to said display such that said hinge is off-center relative to said centerline of said display.

21. The display assembly of claim 20 further comprising:

a first cover disposed around said base; and a second cover disposed so as to enclose said sliding frame, said first rail, and said second rail therewithin, said second cover coupled to said first cover.

22. The display assembly of claim 19 further comprising:

an angled protrusion coupled to said base and adapted to receive cables, said angled protrusion allowing cables to freely slide up and down as said display is moved.

23. The display assembly of claim 21 further comprising:

a mounting region formed in said housing, said mounting region including a plurality of openings adapted to receive screws such that said display can be coupled to other structures by coupling such other structures to said mounting region and inserting screws into ones of said plurality of openings.

24. The display assembly of claim 23 wherein said flat panel display is a liquid crystal display device.

\* \* \* \* \*